(12) United States Patent
Naganuma et al.

(10) Patent No.: US 6,926,454 B1
(45) Date of Patent: Aug. 9, 2005

(54) ELECTROMAGNETIC DRIVING UNIT AND LIGHT QUANTITY REGULATING APPARATUS USING THE SAME

(75) Inventors: Hiroaki Naganuma, Kofu (JP); Yosuke Sasiki, Kofu (JP)

(73) Assignee: Nisca Corporation, Yamanashi-Ken (JP)

( * ) Notice: Subject to any disclaimer, the term of this patent is extended or adjusted under 35 U.S.C. 154(b) by 26 days.

(21) Appl. No.: 10/948,672

(22) Filed: Sep. 24, 2004

(30) Foreign Application Priority Data

Mar. 5, 2004 (JP) .............................. 2004-061844

(51) Int. Cl.[7] .............................................. G03B 17/00
(52) U.S. Cl. ...................... 396/463; 310/46; 310/49 R; 310/156.12; 335/272
(58) Field of Search ................. 310/46–49 A, 310/156.01, 156.08–156.15; 396/458–471; 335/229–234, 335/272

(56) References Cited

U.S. PATENT DOCUMENTS

| | | | | |
|---|---|---|---|---|
| 3,435,392 A | * | 3/1969 | Ouellette et al. | ........... 335/230 |
| 3,898,488 A | * | 8/1975 | Erwin et al. | ................... 310/83 |
| 6,719,463 B2 | * | 4/2004 | Aoshima | ..................... 396/463 |
| 6,756,871 B1 | * | 6/2004 | Suzuki et al. | ................ 335/229 |
| 6,798,987 B2 | * | 9/2004 | Horiike | ........................ 396/75 |
| 2002/0127013 A1 | * | 9/2002 | Mizumaki et al. | .......... 396/463 |

FOREIGN PATENT DOCUMENTS

| | | |
|---|---|---|
| JP | 2001-298936 | 10/2001 |
| JP | 2002-049076 | 2/2002 |

* cited by examiner

Primary Examiner—Ramon M. Barrera
(74) Attorney, Agent, or Firm—Manabu Kanesaka

(57) ABSTRACT

An electromagnetic driving unit includes a rotor having a central shaft and formed of a permanent magnet with a hollow cylindrical shape; an inner yoke disposed on an inner circumferential side of the rotor; an outer yoke disposed on an outer circumferential side of the rotor; and a coil for exciting the inner yoke and outer yoke. The inner yoke has a shaft portion at an end portion thereof inserted into the rotor, and the shaft portion has a circular cross-section or an oval cross-section perpendicular to an axial direction of the shaft portion. The rotor has a bearing recess in an inner circumferential wall thereof, so that the shaft portion of the inner yoke slidably fits in the bearing recess.

15 Claims, 7 Drawing Sheets

diaphragm closing position

Fig. 5(b)

diaphragm opening position

diaphragm closing position

Fig. 7(b)

diaphragm opening position

ELECTROMAGNETIC DRIVING UNIT AND LIGHT QUANTITY REGULATING APPARATUS USING THE SAME

BACKGROUND OF THE INVENTION AND RELATED ART STATEMENT

The present invention relates to a light quantity regulating apparatus such as a shutter and a diaphragm unit used for various types of imaging apparatus such as a video camera, a still camera, and other imaging apparatus. More particularly, the present invention relates to a shutter unit having a vane member to be incorporated in an imaging lens barrel for adjusting imaging light, or a light quantity regulating apparatus for increasing and decreasing quantity of imaging light, and an electromagnetic driving unit for opening and closing the vane member.

In general, a shutter unit and a diaphragm unit mounted on an electronic still camera and an electronic video camera have been widely known as a light quantity regulating apparatus. In the light quantity regulating apparatus, a film type vane member is fixed to a base plate (ground plate) to be incorporated in a lens barrel, so that the vane member freely opens and closes to adjust imaging light.

Such a vane member is formed of a single member or a plurality of vane members, and supported rotatably or slidably with a shaft such as a pin at a periphery of an optical axial hole in a base plate. An electromagnetic driving unit drives the vane member to open and close. The electromagnetic driving unit is formed of a rotor having a permanent magnet and an exciting coil for applying a rotational force to the rotor. Recently, a size and weight of a camera has been reduced, and it has been required to provide a quantity regulating apparatus having small power consumption, a small size and light weight.

Conventionally, in the electromagnetic driving unit, a rotor is formed such that a cylindrical permanent magnet is rotatably supported inside a coil bobbin with a coil around an outer circumference thereof. The coil is wound around an outer circumference of the coil bobbin, and a yoke is provided for magnetically shielding an outer circumference of the coil. The driving unit with such a structure tends to have a large size, especially, have a core having a large outer diameter, in which a rotary shaft is disposed in a magnet rotor.

Japanese Patent Publications (Kokai) No. 2001–298936 and No. 2002–049076 have disclosed structures in which a magnet rotor formed in a hollow cylindrical shape and an annularly wound exciting coil are arranged vertically in an axial direction. A yoke formed of a soft magnetic material is provided for guiding a magnetic field of the exciting coil around the magnet rotor to form a magnetic pole. More specifically, in the apparatuses disclosed in Japanese Patent Publications (Kokai) No. 2001–298936 and No. 2002–049076, a magnet rotor is formed in a hollow cylindrical shape; an inner yoke is disposed at a central opening of the rotor; and an outer yoke is disposed at an outer circumference of the rotor so as to surround the magnet of the rotor. A coil is provided at a position away from the magnet rotor, and the inner and outer yokes guide a magnetic force of the coil to an area around the magnet rotor, thereby generating a rotational force.

In such an electromagnetic driving unit, the hollow magnet rotor is disposed inside the outer yoke having a thin-wall cylindrical shape, and the inner yoke having a rod shape is disposed inside the magnet rotor. Accordingly, it is possible to reduce an outer size of the apparatus. At the same time, the magnet rotor receives rotational torque at an outer circumferential portion thereof near a tolerable outer diameter of the apparatus. Accordingly, it is possible to obtain a large rotational force in the small apparatus. A magnetic circuit is formed of the outer yoke, magnet rotor, and inner yoke in this order. With this structure, it is possible to minimize a gap between the outer yoke and magnet rotor and a gap between the magnet rotor and inner yoke to a minimum level for allowing rotation of the rotor. Accordingly, it is possible to reduce power consumption and increase performance of the magnetic circuit as a whole.

In the electromagnetic driving unit with such a structure, the magnet rotor is rotatably supported with the following structure. In the apparatuses disclosed in Japanese Patent Publication (Kokai) No. 2001-298936, the inner yoke disposed at the central portion of the hollow cylindrical permanent magnet is formed in a hollow cylindrical shape, and a rotary shaft of the magnet rotor passes through a central hole of the inner yoke, so that both ends of the rotary shaft are rotatably supported on the base plate and outer yoke. In the apparatuses disclosed in Japanese Patent Publication (Kokai) No. 2002-049076, the inner yoke with a column shape is disposed in the central hole of the permanent magnet with a hollow cylindrical shape, and a bearing recess is formed in an end surface at a free end of the inner yoke. Both ends of the rotary shaft provided at the central portion of the magnet rotor are supported on the recess formed in the end surface of the inner yoke and a bearing hole formed in the base plate.

In the supporting structure disclosed in Japanese Patent Publication (Kokai) No. 2001-298936, the inner yoke is disposed inside the magnet rotor, and the rotary shaft of the rotor is disposed inside the inner yoke. Accordingly, the apparatus tends to have a large diameter. Moreover, it is difficult to align the inner yoke with the cylindrical shape while the rotary shaft is formed at the center of the rotor. When the rotor rotates, a magnetic gap between the magnet and inner yoke is easy to fluctuate, thereby making the apparatus large.

In the bearing structure disclosed in Japanese Patent Publication (Kokai) No. 2002-049076, the bearing recess is formed in the end surface of the shaft of the inner yoke with a column shape. Accordingly, the inner yoke has a free end surface having a V shape cut portion, thereby reducing magnetic force formed in a loop shape between the inner yoke and outer yoke. That is, the recess lowers performance of the magnetic circuit and causes a problems in the magnetic circuit formed between the outer and inner yokes. Further, in the bearing structures disclosed in Japanese Patent Publications (Kokai) No. 2001-298936 and No. 2002-049076, when a diameter of the rotor shaft is reduced, it is difficult to machine the bearing portion and obtain good durability against friction.

In view of the problems described above, an object of the present invention is to provide an electromagnetic driving unit having a small size and a bearing recess with a simple structure, wherein when a rotary shaft of a magnet rotor is supported on an inner yoke, it is possible to maintain magnetic gaps between the magnet rotor and the inner and outer yokes, respectively, and it is also possible to maintain performance of the magnetic circuit.

Another object of the present invention is to provide a light quantity regulating apparatus having a small size by reducing a size of the electromagnetic driving unit, especially, an outer diameter thereof.

Further objects and advantages of the invention will be apparent from the following description of the invention.

SUMMARY OF THE INVENTION

In order to attain the objects described above, according to present invention, an electromagnetic driving unit includes a rotor formed of a permanent magnet with a hollow cylindrical shape and having a central shaft; an inner yoke formed of a soft magnetic material and disposed inside the rotor; and an outer yoke disposed on an outer circumference side of the rotor. The permanent magnet is formed of a ferromagnetic material such as a rare earth plastic, and molded in a hollow cylindrical shape. A rotary shaft member constituting the central shaft is formed of a synthetic resin, and is integrated with the permanents magnet with insert molding to form the rotor. The inner and outer yokes are formed of a soft magnetic material such as iron. The inner yoke is formed in a shape such as a rod shaft shape, and the outer yoke is formed in a cylindrical shape. A coil is provided for exciting the inner and outer yokes. The inner yoke is provided with a shaft portion having a circular cross-section at an end portion thereof located in the hollow body of the rotor. The rotor is provided with a bearing recess in the hollow body thereof, so that the shaft portion of the inner yoke slidably engages the bearing recess of the rotor.

The shaft portion of the inner yoke and the bearing recess of the rotor have contact surfaces contacting with each other in an axial direction and a radial direction of the rotor, respectively, so that the rotor is rotatably supported in the axial and radial directions. At least one of the shaft portion of the inner yoke and the bearing recess of the rotor is formed of a nonmagnetic material, so that the rotor and the yoke are magnetically isolated. As a result, a magnetic circuit is formed for exerting a rotational force on the rotor.

In the present invention, a bearing structure between the rotor formed of the permanent magnet with the hollow cylindrical shape and the inner yoke disposed in the hollow body of the rotor is formed of the shaft portion of the inner yoke with the circular cross-section. The shaft portion engages the bearing recess formed in the hollow of the rotor, thereby obtaining the following advantages.

The shaft portion of the inner yoke is formed on an outer circumferential surface of the end portion thereof inserted into the hollow body of the rotor, and the shaft portion engages the bearing recess. Accordingly, it is easy to produce the shaft portion even when the inner yoke has a small diameter, and the shaft portion is supported smoothly and reliably, thereby making the apparatus small. The inner yoke does not have a recessed end surface for supporting, thereby maintaining performance of the magnetic circuit. Moreover, the shaft portion formed on the outer circumferential wall of the inner yoke engages the bearing recess formed in an inner circumferential wall of the hollow rotor. Accordingly, it is possible to accurately maintain a magnetic gap between the magnet of the rotor and the inner yoke, thereby allowing the rotor to rotate smoothly.

According to the present invention, it is possible to reduce a size of the electromagnetic driving unit, thereby making a light quantity regulating apparatus small and light weight.

DETAILED DESCRIPTION OF PREFERRED EMBODIMENTS

Figure 1:
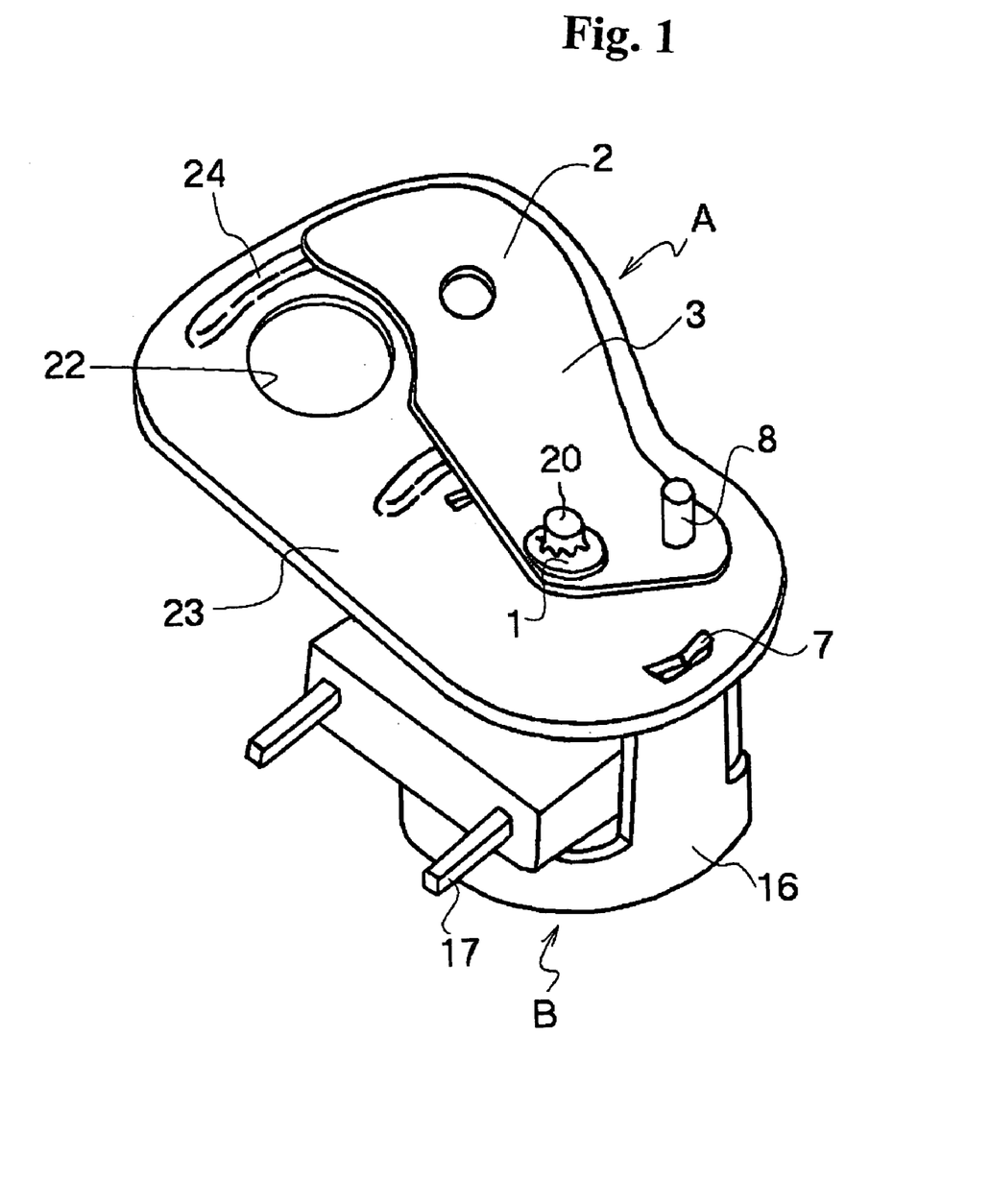
FIG. 1 is a perspective view showing a light quantity regulating apparatus according to an embodiment of the present invention.
Figure 2:
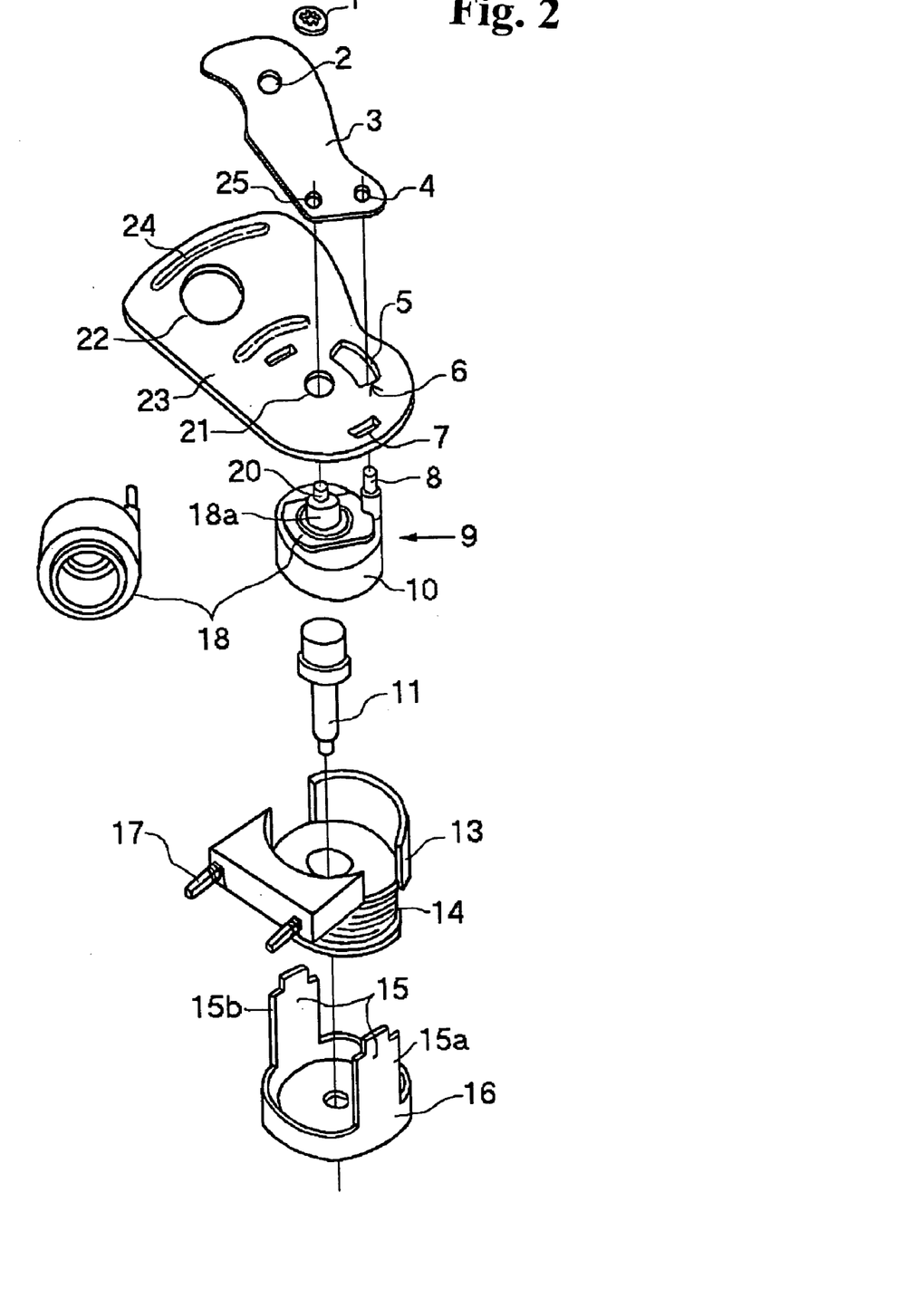
FIG. 2 is an exploded perspective view showing the apparatus shown in FIG. 1.
Figure 3:
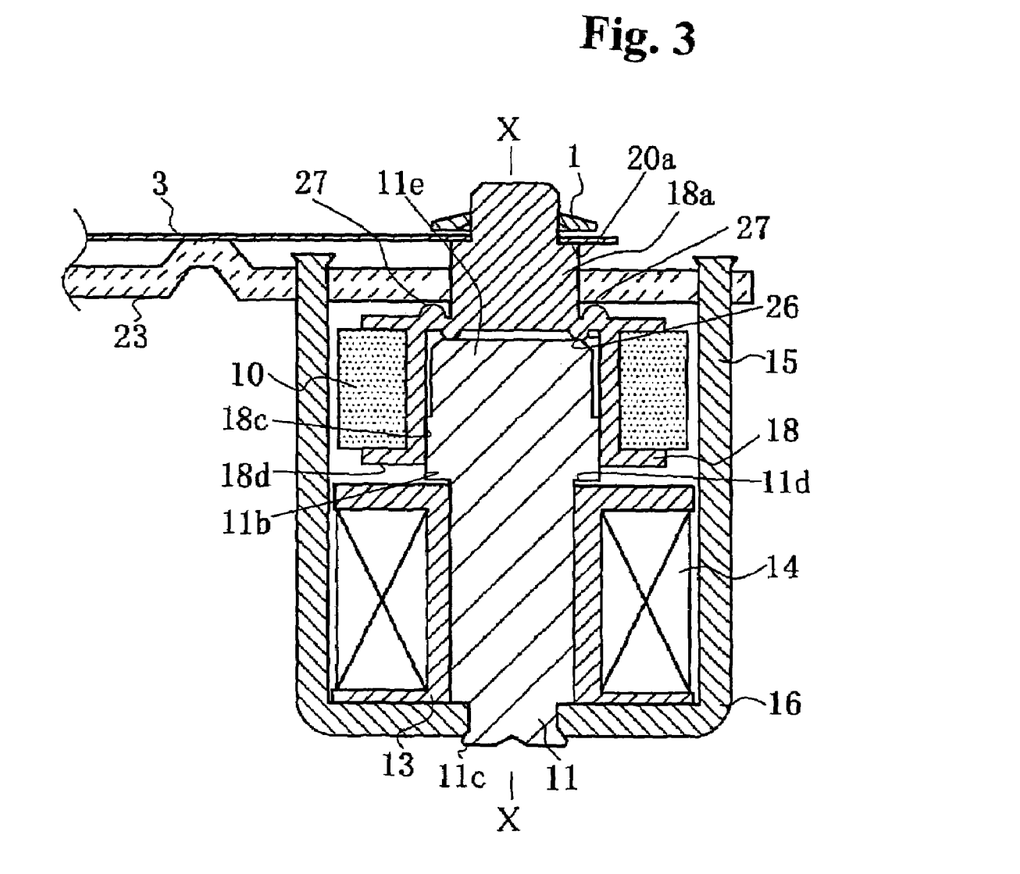
FIG. 3 is a central longitudinal sectional view of a driving unit (driving device) of the apparatus shown in FIG. 1.

Hereunder, embodiments of the present invention will be described in detail with reference to the accompanying drawings. FIG. 1 is a perspective view of a light quantity regulating apparatus as a whole according to an embodiment of the present invention. FIG. 2 is an exploded perspective view of the apparatus shown in FIG. 1, and FIG. 3 is a central longitudinal sectional view of a driving unit.

As shown in the drawings, the light quantity regulating apparatus includes a light quantity regulating unit A to be incorporated in an imaging lens barrel of various camera apparatus, and an electromagnetic driving unit B for driving a vane member of the light quantity regulating unit A to open and close. The light quantity regulating unit A is formed of a base plate 23 to be incorporated in the lens barrel of the camera apparatus and a diaphragm vane 3 provided on the base plate 23. The base plate 23 is formed in a suitable shape with resin molding or a metal plate formed of a nonmagnetic material such as aluminum, and is provided with an optical axial hole 22 aligned with an imaging optical axis.

The base plate 23 is incorporated in the lens barrel of the camera apparatus to be perpendicular to the imaging optical axis, and the center of the optical axial opening 22 is aligned with the imaging optical axis. The base plate 23 is integrally formed of yoke fitting holes 7 (described later); a slit 5 for restricting a movement of the vane and for inserting a transmitting member; a bearing hole 21 for supporting a rotor (described later); and a guide rib 24 for guiding the diaphragm vane 3. As shown in FIG. 1, the diaphragm vane 3 is attached to an upper surface of the base plate 23, and the electromagnetic driving unit B is attached to a lower surface of the base plate 23.

The diaphragm vane 3 is formed of one or a plurality of vane members for adjusting an opening of the optical axial hole 22 to be larger or smaller. In the embodiment, the diaphragm vane is formed of a single diaphragm vane member 3 for regulating the imaging optical axial opening in two states, i.e. a fully-opened state and a small aperture state. The diaphragm vane 3 is formed by press-punching a polyester resin film plate member impregnated with a black pigment. The diaphragm vane 3 is provided with a small aperture hole 2; a transmitting pin connecting hole 4 for fitting the transmitting member (described later); and a pivot fitting hole 25 for fitting a vane support shaft (described later).

The diaphragm vane 3 is provided with the small aperture hole 2 having a diameter smaller than that of the optical axial hole 22 of the base plate 23. The diaphragm vane 3 is supported on the vane support shaft of the rotor at the pivot fitting hole 25, and is fixed to the base plate 23. Accordingly, when the diaphragm vane 3 rotates around the vane support shaft of the rotor and is positioned at the optical axial hole 22 of the base plate 23, the small aperture hole 2 of the vane limits quantity of imaging light in the small aperture state. Conversely, when the vane 3 is at a position (posture)

retreated from the optical axial hole 22, the optical axial hole 22 restricts the quantity of the imaging light (fully opened state).

In the embodiment, the diaphragm vane 3 is formed of a single vane member. Alternatively, the diaphragm vane may be formed of a plurality of vane members to form a plurality of diameters, i.e. small, intermediate and large diameters, by selectively closing the vane members over the optical axial hole 22. Also, the diaphragm vane may be formed of a plurality of vanes gradually moving over the optical axial opening 22 to open and close the optical axial opening 22, thereby continuously adjusting the opening of the optical axial opening 22. In the former case where a plurality of vane members closes selectively over the optical axial hole 22, a plurality of vane members is laminated on the base plate 23 and rotatably fixed thereto with a pin. A driving unit (described later) is connected selectively to the vane members through, for example, a cam mechanism. In the latter case where a plurality of vane members moves over the optical axial hole 22 to continuously adjust the quantity of light, the vane members are arranged so as to cover the optical axial hole 22 with respective outer circumferential edges thereof. A driving unit moves the vane members simultaneously, thereby arbitrarily adjusting quantity of imaging light from a small aperture to a large aperture.

The electromagnetic driving unit B will be described next. The electromagnetic driving unit B includes a rotor 9 formed of a permanent magnet 10; a rotary shaft member 18 for supporting the rotor 9 to be rotatable; a yoke for forming a magnetic field around the rotor 9; and an exciting coil 14 for generating a magnetic field in the yoke. The rotor 9 is formed of a ferromagnetic material, for example, a neodymium rare earth plastic, and has a hollow cylindrical shape. The rotor 9 is integrated with the rotary shaft member 18 by insert-molding a resin material, such as a liquid crystal polymer.

The rotary shaft member 18 is an integrated resin molded member and provided with a flange portion 18d for holding the permanent magnet 10; a shaft portion 18a at a position aligned with a central axis (X—X in FIG. 3) of the permanent magnet 10 with a cylindrical shape; and a bearing recess 18c. Therefore, the rotor 9 is integrated with the rotary shaft member 18 formed of a synthetic resin in the hollow body of the permanent magnet 10 with a hollow cylindrical shape. The rotary shaft member 18 is provided with the shaft portion 18a at one portion thereof along the central axis X—X, and with a bearing recess 18c at the other portion thereof.

The rotary shaft member 18 is provided with a vane support shaft 20 at a free end of the shaft portion 18a for supporting the vane 3 to be rotatable. The rotary shaft member 18 is also provided with a transmitting member 8 having a pin shape (hereinafter referred to as a transmitting pin) at a position away from the central axis X—X. The transmitting pin 8 is fitted in the transmitting pin connecting hole 4 of the diaphragm vane 3. The rotary shaft member 18 is supported on the base plate 23 at the shaft portion 18a, and is supported on the inner yoke 11 at the bearing recess 18c to be rotatable around the central axis X—X. A bearing structure or supporting structure will be described later.

The yoke includes an inner yoke 11 positioned inside the cylindrical hollow body and an outer yoke 16 positioned on the outer circumference of the magnet 10 with the permanent magnet therebetween. The inner and outer yokes 11 and 16 are formed out of a soft magnetic material such as iron, and the outer yoke has a pair of magnetic pole induction members 15a and 15b opposed to each other as shown in FIG. 2. The inner yoke 11 is formed in a shaft shape inserted into a central hole of the rotor 9, and the inner yoke 11 and outer yoke 16 are integrally tight-fitted at a fixing portion 11c.

The outer yoke 16 is formed in a cylindrical shape so as to hold the rotor 9 with a cylindrical shape therein, and the inner yoke 11 is fixed to a central portion of a bottom wall of the outer yoke 16. The outer yoke 16 is formed of a plurality of members having a comb teeth shape such that opposed magnetic poles are formed on the outer circumference of the permanent magnet 10. In the embodiment, the outer yoke is provided with a pair of members at opposed positions with the magnet 10 therebetween. As described above, the inner yoke 11 and outer yoke 16 are made of a soft magnetic material, such as an iron-based material so as to induce a magnetic field to the circumference of the permanent magnet 10 of the rotor 9. The inner yoke 11 is tightly fitted into the outer yoke 16, so that the two yoke members are magnetically connected to each other. The outer yoke 16 supports the inner yoke 11, thereby obtaining strength as a single structural body.

A exciting coil 14 is wound around one of the outer and inner yokes 16 and 11. In the embodiment, a conductor wire is wound around a coil bobbin 13 formed of a resin material such as liquid crystal polymer to form the coil, and the coil is fitted around the fixing portion 16c of the outer yoke 16 to form the exciting coil 14. Accordingly, when an electric current is supplied to the exciting coil 14, a magnetic field generated in the exciting coil 14 is guided by the outer yoke 16 and inner yoke 11, so that opposed magnetic poles are created with the permanent magnet 10 of the rotor 9 therebetween.

In the embodiment, the coil frame 13 is inserted into the inner yoke 11, and the lower end portion 11c of the inner yoke 11 is fitted to the outer yoke 16 as shown in FIG. 3. Therefore, the coil frame 13 is fixed to the outer yoke 16 while being supported on the inner yoke 11. Reference numeral 11b denotes the flange formed on the inner yoke 11 for supporting the coil bobbin 13. The magnetic pole induction members 15a and 15b of the outer yoke 16 are fixed to the base plate 23 in the following manner. End portions of the magnetic pole induction members 15a and 15b are fitted in the yoke fitting holes 7, so that the outer yoke 16 is tightly fitted into the base plate 23.

As described above, the outer yoke 16 is fixed to the base plate 23, and the inner yoke 11 and coil bobbin 13 are fixed to the outer yoke 16. The rotor 9 is supported on the base plate 23 and inner yoke 11 to be rotatable. As mentioned above, the rotor 9 is formed of the permanent magnet 10 with a hollow cylindrical shape. The rotary shaft member 18 made of a nonmagnetic material is provided at a central portion of the rotor, and the rotary shaft member 18 is provided with the shaft portion 18a. The shaft portion 18a is formed in a pin shape with a circular cross-section, and is fitted in the bearing hole 21 formed in the base plate 23. The shaft portion 18a is provided with the vane support shaft 20 having a stepped portion 20a, and is fitted in the pivot fitting hole 25 in the diaphragm vane 3. Reference numeral 17 denotes terminal pins of the exciting coil 14.

The diaphragm vane 3 is rotatably supported with the stepped portion 20a and a holding washer 1 (E ring) fitted around the vane support shaft 20. As described above, the rotor 9 is supported on the base plate 23 at one end thereof, and is rotatably supported on the inner yoke 11 at the other end thereof (lower side in FIG. 3). The inner yoke 11 is fixed to the outer yoke 16 at one end thereof, and is inserted into the hollow body of the rotor 9 at the other end thereof. The inner yoke 11 is provided with a shaft portion 11d for supporting the rotor 9 to be rotatable. The shaft portion 11d is formed in a solid column shape, and has an outer circumferential surface for supporting the rotor 9.

On the other hand, in the rotor 9, the bearing recess 18c is provided in the rotary shaft member 18 integrally formed on the central portion of the hollow cylindrical permanent magnet 10. The outer circumferential surface of the shaft portion 11d engages the inner circumferential surface of the bearing recess 18c, so that the rotor 9 is rotatably supported on the inner yoke 11. In this case, the rotary shaft member 18 is formed out of a resin such as liquid crystal polymer, i.e. a nonmagnetic material, and the inner yoke 11 is formed out of a soft magnetic material such as an iron-based material. Accordingly, it is possible to form mutually opposed magnetic poles between the inner yoke 11 and the permanent magnet 10 of the rotor 9 with the rotary shaft member 18 in between. The rotary shaft member 18 may be made of a material suitably selected in view of lubricating characteristic, friction characteristic, and nonmagnetic characteristic at the bearing recess 18c. A resin material such as liquid crystal polymer is suitable due to easy processing.

The rotary shaft member 18 is provided with the bearing recess 18c as described above, and is also provided with an inner yoke side rib 26 for engaging an end surface 11e (refer to FIG. 3) of the inner yoke 11 and a base plate side rib 27 for engaging the base plate 23 so as to restrict an axial (thrusting direction) movement of the rotor 9. The inner yoke side rib 26 and base plate side rib 27 are integrally molded on the rotary shaft member 18 as annular projections so as to reduce friction. Accordingly, the rotor 9 is rotatably supported between the end surface 11e of the inner yoke 11 and base plate 23.

Figure 5A:
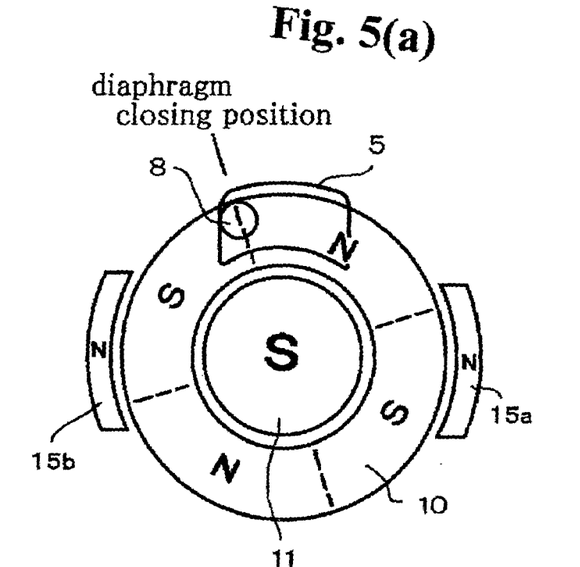
FIGS. 5(a) and 5(b) are explanatory views of an operating condition of the apparatus shown in FIG. 1.
Figure 5B:
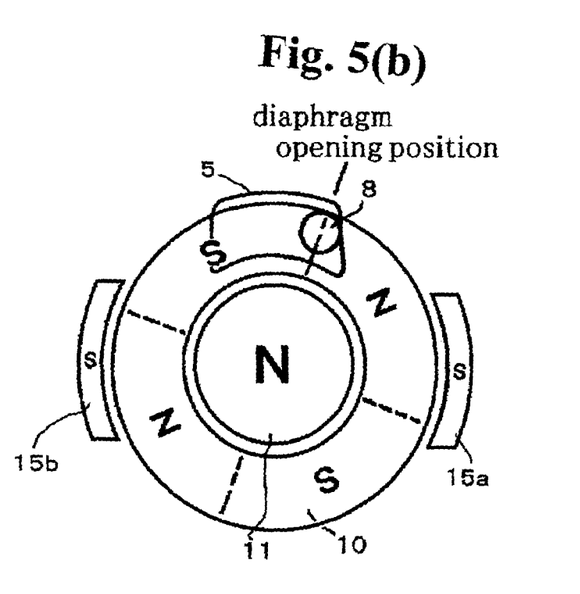

A magnetic circuit of the yoke and rotor will be described next. As shown in FIGS. 5(a) and 5(b), the rotor 9 is magnetized to have four N-S poles on the outer circumference of the permanent magnet 10. The inner yoke 11 and outer yoke 16 are arranged so as to face each other with the permanent magnet 10 therebetween. The inner yoke 11 with the rod shape is disposed in the hollow body of the permanent magnet 10, and has magnetic poles on the outer circumferential surface thereof. The outer yoke 16 has the two magnetic pole induction members 15a and 15b for forming magnetic poles at the positions facing the outer circumferential surface of the permanent magnet 10. The inner and outer yokes 11 and 16 induce the magnetic force generated in the exciting coil 14, and form the magnetic poles with the permanent magnet 10 therebetween.

Referring to FIG. 5(a), when an electric current is supplied to the exciting coil 14 in one direction, N-poles are formed on the outer yoke 16 and S-poles are formed on the inner yoke 11, so that the rotor 9 rotates counter-clockwise in the drawing. Conversely, as shown in FIG. 5(b), when an electric current is supplied to the exciting coil 14 in a reverse direction, S-poles are formed on the outer yoke 16 and N-poles are formed on the inner yoke 11, so that the rotor 9 rotates clockwise in the drawing. The rotor 9 has the transmitting pin 8 integrated with the rotary shaft member 18 for transmitting the rotation of the rotor to outside. The transmitting pin 8 passes through the elongated hole (slit) 5 in the base plate 23, and is fitted in the transmitting pin fitting hole 4 in the diaphragm vane 3.

Accordingly, when an electric current is supplied to the exciting coil 14 in one direction, the rotor 9 rotates clockwise, and when an electric current is supplied to the exciting coil 14 in a reverse direction, the rotor 9 rotates counter-clockwise. The rotation of the rotor 9 in the forward and reverse directions is transmitted to the diaphragm vane 3 with the transmitting pin 8. As a result, the diaphragm vane 3 rotates clockwise or counter-clockwise around the vane support shaft 20. Accordingly, in the state shown in FIG. 5(a), the diaphragm vane 3 is positioned at the optical axial opening 22, and the small aperture hole 2 controls the quantity of imaging light (small aperture state). In the state shown in FIG. 5(b), the diaphragm vane 3 moves to a position retreated from the optical axial hole 22, and the optical axial hole 22 controls the quantity of imaging light (fully opened state).

As shown in FIGS. 5(a) and 5(b), the elongated hole (slit) 5 is formed in the base plate 23 to form a movement restriction region in which the rotor 9 rotates back and forth in the forward and reverse directions within a predetermined angle. Therefore, the rotor 9 rotates by a predetermined angle within a range defined by end surfaces 6 of the elongated hole (slit) 5 formed in the base plate 23, and the transmitting pin 8 drives the diaphragm vane 3 to move between the fully opened state (shown in FIG. 5(b)) and the small aperture state (shown in FIG. 5(a)). Incidentally, it is necessary to hold the diaphragm vane 3 at the fully opened position (shown in FIG. 5(b)) and the small aperture position (shown in FIG. 5(a)). A method for this purpose (not shown) includes a method in which an extremely low level current flows to the exciting coil 14 for holding the diaphragm vane at each position; a method in which a closed spring is provided for urging in one direction and an electric current is supplied to the exciting coil 14 to restrict a position of the vane; and a method in which iron pieces are provided around the vane for magnetically attracting the same. Any of the methods may be employed.

Figure 4:
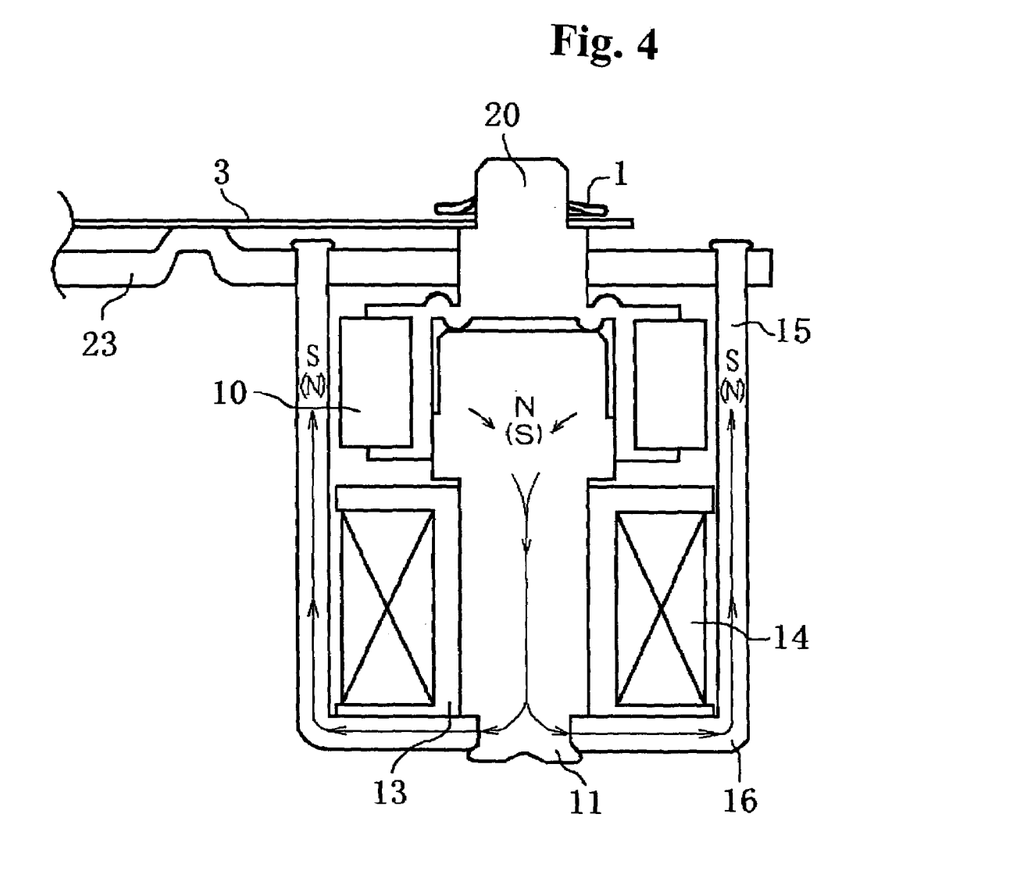
FIG. 4 is an explanatory view of a magnetic circuit in the driving unit in the apparatus shown in FIG. 1.

An operation of the apparatus according to the present invention will be described. Referring to FIG. 4, when an electric current is supplied to the exciting coil 14, the outer and inner yokes 16 and 11 are magnetized through the magnetic field generated in the coil. At this time, the inner yoke 11 and outer yoke 16 are magnetically connected together at the end portions thereof, and the other end portions face each other with the rotor 9 in between. When the outer yoke 16 has an N-pole, the inner yoke 11 has an S-pole. When the outer yoke 16 has an S-pole, the inner yoke 11 has an N-pole. That is, the outer and inner yokes 16 and 11 are magnetically connected together at the fitted end portions, and opposed magnetic poles (N-S poles) with the permanent magnet 10 in between are formed at the end portion of the inner yoke 11 with a rod shape and the end portions of the magnetic pole induction pieces 15a and 15b of the outer yoke 16.

As shown in FIGS. 5(a) and 5(b), the rotor 9 is magnetized to have four poles on the outer circumference of the hollow cylindrical body thereof, and the transmitting pin 8 is disposed at one of the poles. That is, the rotor 9 is magnetized into the four poles, and the elongated hole (slit) 5 in the base plate 23 restricts the rotor 9 to rotate clockwise and counter-clockwise at a predetermined angle around a pole dividing position within the movement region. Therefore, when the magnetic induction pieces 15a and 15b have N-poles and the inner yoke 11 has an S-pole as shown in FIG. 5(a), the N-poles of the magnetic induction pieces 15a and 15b magnetically attract the S-pole of the rotor 9 and repel the N-pole of the rotor 9, so that the rotor 9 rotates counter-clockwise. The rotor 9 stops at a position where the transmitting pin 8 engages the elongated hole (slit) 5 in the base plate 23. At the position, the magnetic pole (S-pole) is in a position near (close to) the magnetic pole induction pieces 15a and 15b, and the permanent magnet 10 of the rotor 9 is thereby attracted to the magnetic pole induction pieces 15a and 15b and held at the position even when the current supplied to the exciting coil 14 is turned off (OFF).

When an electric current is supplied to the exciting coil 14 in a reverse direction, the magnetic pole induction pieces 15a and 15b of the outer yoke 16 have S-poles, and the inner yoke 11 has an N-pole as shown in FIG. 5(b). In this state, the S-poles on the magnetic pole induction pieces 15a and 15b magnetically attract the N-pole on the rotor 9, and repel the S-pole on the rotor 9, so that the rotor 9 rotates clockwise. The rotor 9 stops at a position where the transmitting pin 8 is stopped at the end of the elongated hole (slit) in the base plate 23. Even when the current supplied to the excitation coil 14 is turned off in this state, the N-pole of the rotor 9 is attracted to the magnetic pole induction pieces 15a and 15b constituting the magnetic members in the same manner as mentioned above, and the transmitting pin 8 engages the end of the elongated hole (slit) 5 and is held in this state.

As described above, in the embodiment, the outer yoke 16 is not disposed all around the outer circumference of the permanent magnet 10 constituting the rotor 9, and is rather disposed at one position or two opposed positions. Accordingly, it is possible to hold the diaphragm vane 3 at a predetermined position when a current supplied to the exciting coil 14 is turned off.

Another embodiment of the present invention will be described next with reference to FIG. 6 and FIGS. 7(a) and 7(b). The base plate 23 is formed out of a nonmagnetic material, such as an aluminum alloy, in the same manner as the embodiment described before. The base plate 23 is integrally provided with the optical axial hole 22 at a position aligned with an axis of imaging light; the yoke fitting holes 7; the elongated hole (slit) 5 for restricting a movement of the transmitting pin 8; and the guide rib 24 for guiding the vane. The diaphragm vane 3 is made of a synthetic resin film material, and is provided with the small aperture hole 2; the transmitting pin connecting hole 4; and the pivot hole 25.

Similar to the embodiment described above, the driving unit B includes the rotor 9 formed of the permanent magnet 10 with a hollow cylindrical shape; the rotary shaft member 18 for holding the rotor 9; the yoke made of a soft magnetic member for forming a magnetic field around the circumference of the rotor 9; and the exciting coil 14 for magnetizing the yoke. The yoke includes the inner yoke 11 and the outer yoke 16. The inner yoke 11 is formed in a bar shape inserted into the hollow body of the permanent magnet 10, and the outer yoke 16 is provided with the magnetic pole induction pieces with a comb teeth shape disposed at parts of the outer circumferential portion of the permanent magnet 10.

Figure 6:
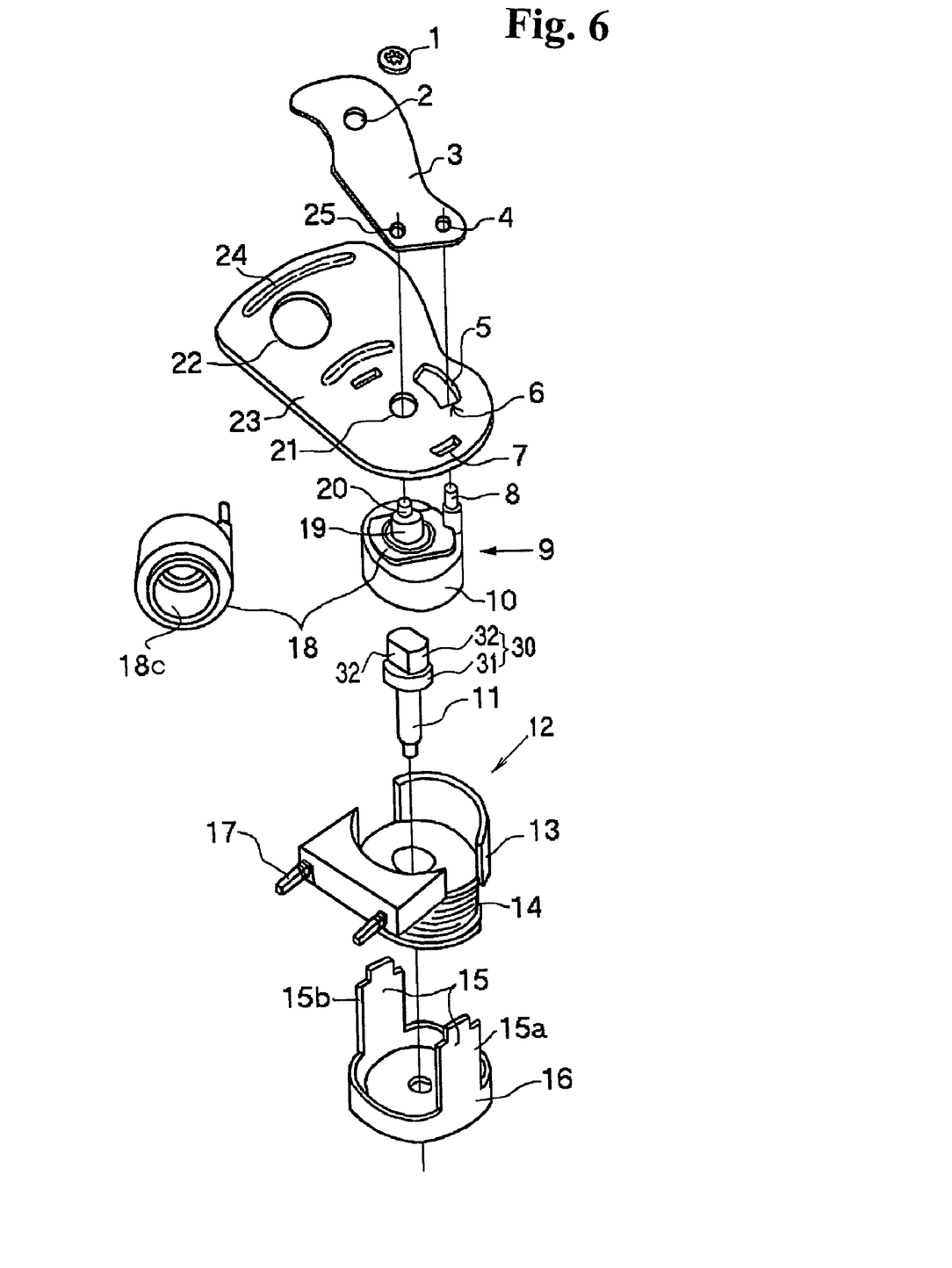
FIG. 6 is an exploded perspective view of an apparatus different from that shown in FIG. 1.
Figure 7A:
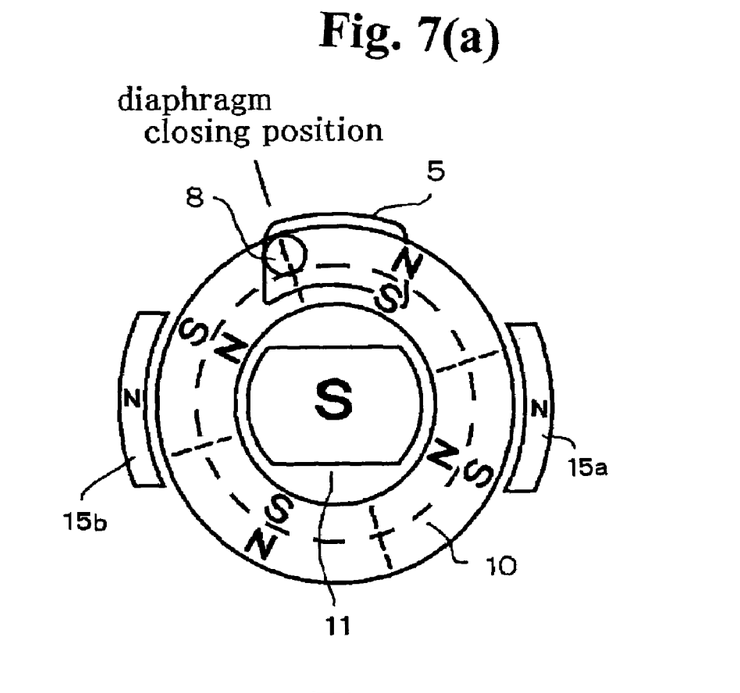
FIGS. 7(a) and 7(b) are explanatory views of an operating condition of the driving unit shown in FIG. 6.
Figure 7B:
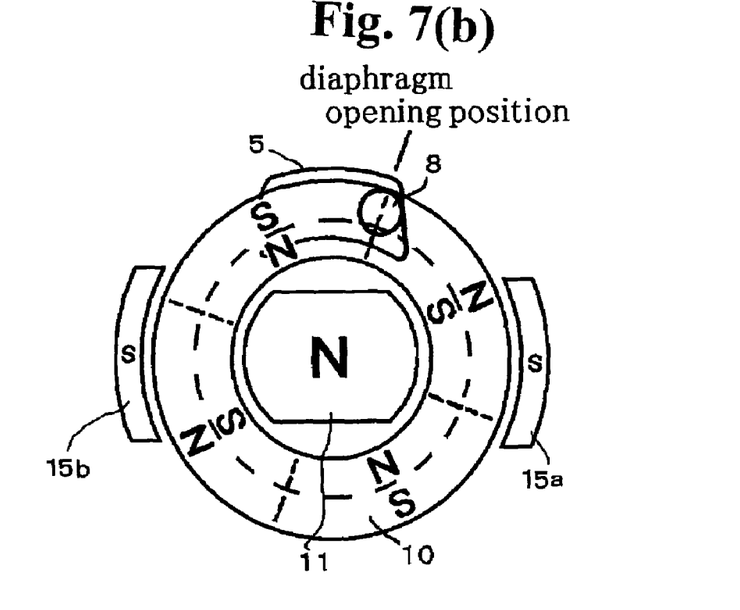

In the present embodiment, the inner yoke 11 is formed in the bar shape, and provided with a coil frame insert portion 30; a shaft support portion 31; and a magnetic pole forming portion 32 as shown in FIG. 6. The coil frame 13 is fitted around the coil bobbin insert portion 30. The coil bobbin 13 is formed out of a resin material, such as liquid crystal polymer, and provided with the coil 14 formed by winding a conductor wire around an outer circumference thereof. The shaft support portion 31 is formed in a shaft shape with a circular cross-section so as to be fitted in the bearing recess 18c (described later) of the rotor 9. The magnetic pole forming portion 32 on the inner yoke 11 has an oval shape, i.e. non-circular, so that a large gap and a small gas are formed relative to an inner surface of the permanent magnet 10 with a circular cross-section.

Similar to the previous embodiment, the rotor 9 is formed by integrally fixing the permanent magnet 10 with a hollow cylindrical shape to the rotary shaft member 18 formed of a resin material such as liquid crystal polymer with insert molding. The rotary shaft member 18 is provided with the shaft support portion 31 and the bearing recess 18c. The bearing recess 18c is fitted around the shaft support portion 31 of the inner yoke 11, and one end portion (lower side in FIG. 6) of the rotor 9 is rotatably supported on the inner yoke 11.

Similar to the apparatus shown in FIG. 1, the shaft support section 31 of the rotary shaft member 18 is rotatably supported in the pivot hole 25 formed in the base plate 23. As shown in FIGS. 7(a) and 7(b), the permanent magnet 10 is magnetized into four divided poles in the circumferential direction, and also magnetized into N-S poles in the radial direction. With this structure, the magnetic poles of the rotor 9 along the inner circumference attract a portion of the oval shape of the inner yoke 11 to rotate the rotor 9 in a direction same as a rotational direction produced along the outer circumference of the rotor 9. Accordingly, driving torque of the electromagnetic driving unit is increased.

In particular, similar to the apparatus shown in FIG. 1, the exciting coil is disposed at a base end portion (lower side in FIG. 2 and FIG. 6) of the inner yoke 11 with a rod shaft, and the end portion of the inner yoke is disposed close to the rotor. Also, the bearing recess 18c is provided at the central portion, so that the bearing structure does not influence the magnetic attractive force between the end portion of the inner yoke 11 in which the large magnetic pole is generated and the rotor, thereby obtaining a large rotational force with small power consumption.

The disclosure of Japanese Patent Application No. 2004-061844, filed on Mar. 5, 2004, is incorporated in the application.

While the invention has been explained with reference to the specific embodiment of the invention, the explanation is illustrative and the invention is limited only by the appended claims.

What is claimed is:

1. An electromagnetic driving unit comprising:
a rotor formed of a permanent magnet with a hollow cylindrical shape and having a central shaft and a bearing recess in an inner circumferential wall thereof,
an inner yoke disposed at an inner circumferential side of the rotor and having a shaft portion at an end portion thereof inserted into the rotor, said shaft portion slidably fitting in the bearing recess,
an outer yoke disposed on an outer circumferential side of the rotor, and
a coil for exciting the inner yoke and outer yoke disposed at the inner yoke or outer yoke.

2. An electromagnetic driving unit according to claim 1, wherein said shaft portion of the inner yoke and said bearing portion of the rotor have contact surfaces contacting with each other in an axial direction and a radial direction of the rotor, respectively.

3. An electromagnetic driving unit according to claim 1, wherein at least one of said shaft portion of the inner yoke and said bearing portion of the rotor is formed of a nonmagnetic material.

4. An electromagnetic driving unit according to claim 1, wherein said rotor further includes a rotary shaft member disposed in the permanent magnet, said bearing recess being formed in the rotary shaft member.

5. An electromagnetic driving unit according to claim 4, wherein said rotary shaft member includes a transmitting member for transmitting a rotational force of the rotor to outside.

6. An electromagnetic driving unit according to claim 4, wherein said rotor is formed by the permanent magnet and the rotary shaft member integrally molded together with a synthetic resin.

7. An electromagnetic driving unit according to claim 1, wherein said shaft portion has a circular cross-section perpendicular to an axial direction of the shaft portion.

8. An electromagnetic driving unit according to claim 1, wherein said shaft portion has an oval cross-section perpendicular to an axial direction of the shaft portion.

9. A light quantity regulating apparatus according to claim 1, wherein said outer yoke includes at least two magnetic pole-forming pieces facing each other with the rotor therebetween.

10. An electromagnetic driving unit according to claim 7, wherein said permanent magnet is magnetized to have N-poles and S-poles alternately in a circumferential direction.

11. An electromagnetic driving unit according to claim 8, wherein said permanent magnet is magnetized to have N-poles and S-poles alternately in a circumferential direction and in a radial direction.

12. A light quantity regulating apparatus comprising:
a base plate having an optical axial hole,
a vane member slidably disposed on the base plate for adjusting an opening of the optical axial hole,
a rotor having a rotary shaft member with a central shaft and formed of a permanent magnet with a hollow cylindrical shape disposed around the rotary shaft member, said rotary shaft member attached to the vane member and having a bearing recess,
an inner yoke disposed in the rotor and having a shaft portion at an end portion thereof inserted into the rotor, said shaft portion slidably fitting in the bearing recess,
an outer yoke disposed on an outer circumferential side of the rotor, and
a coil for exciting the inner yoke and outer yoke disposed at the inner yoke or outer yoke.

13. A light quantity regulating apparatus according to claim 12, wherein said outer yoke includes at least two magnetic pole-forming pieces facing each other with the rotor therebetween.

14. An electromagnetic driving unit according to claim 12, wherein said shaft portion has a circular cross-section perpendicular to an axial direction of the shaft portion.

15. An electromagnetic driving unit according to claim 12, wherein said shaft portion has an oval cross-section perpendicular to an axial direction of the shaft portion.

* * * * *